F. W. DORN.

Improvement in Apparatus for Separating Tin from Scrap

No. 124,890. Patented March 26, 1872.

Witnesses.
P. Ulrich.
C. Langer

Inventor:
Frederick William Dorn.

UNITED STATES PATENT OFFICE.

FREDERICK WILLIAM DORN, OF NEW YORK, N. Y.

IMPROVEMENT IN APPARATUS FOR SEPARATING TIN FROM SCRAP.

Specification forming part of Letters Patent No. 124,890, dated March 26, 1872; antedated March 8, 1872.

Specification describing a Rotary Drum for the Separation of Metals, invented by FRED. WM. DORN, of New York, in the county and State of New York.

My invention relates to a drum, consisting of a metal frame (for which I consider copper the most suitable,) and perforated glass plates or plates of hot-cast porcelain, or any similar material, the latter of which can be inserted between the ribs of the frame. The ends of the drum consist of metal disks, and through their center runs a shaft which may be complete or merely attached to the outside of the ends. The drum is charged with the metals to be separated from each other, and is made to rotate in a vat in which the liquor is contained for the process. I use it particularly for the separation of tin from iron in tinners' clippings, or of zinc and iron in galvanized iron clippings, or of tin and copper in tinned copper clippings.

Figure 1:
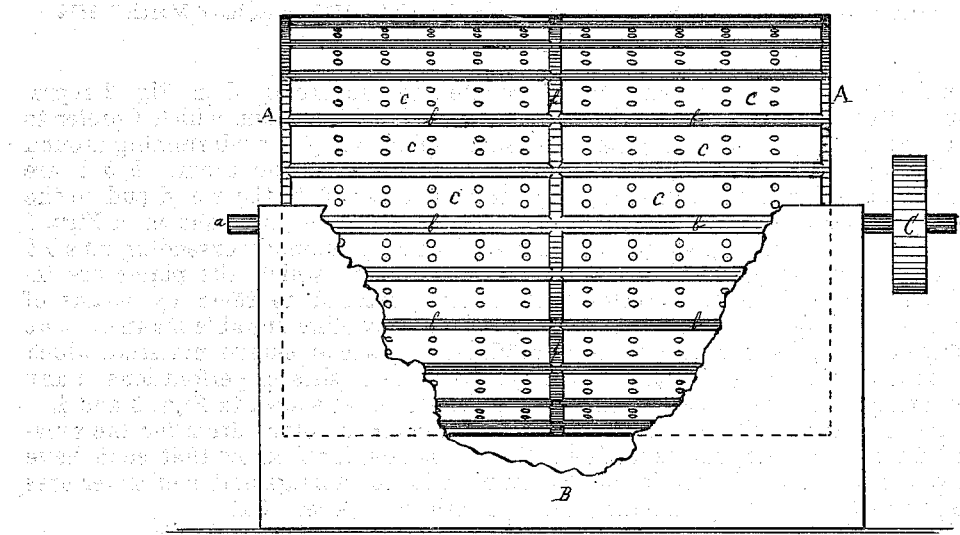
Figure 2:
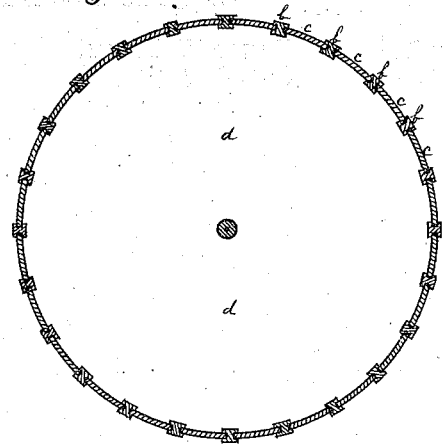
Figure 3:
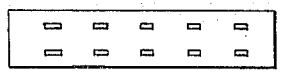
Figure 4:
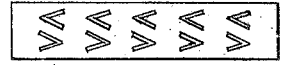

Figure 1 exhibits a front view of my drum, partially immersed in a vat. Fig. 2 is a side elevation of the drum. Figs. 3 and 4 are perforated plates.

A is the drum. B is the vat. $a$ is the shaft; C, the pulley, from which the motion is communicated to the drum. $d$ in Fig. 2 represents the ends of the drum, which I prefer to construct of metal $f$ is a rib running around the circumference of the drum. $b\ b\ b$ are metal ribs attached to the rib $f$, and to the circumference of the ends, as shown in Figs. 1 and 2. The longitudinally-extending ribs $b\ b\ b$ have grooves in which the plates are inserted and fastened to them by means of screws, or in any other suitable manner. $c\ c\ c$ are plates of glass or similar material, which may have holes or slits, or perforations of any design whatever, as shown in Figs. 3 and 4.

I do not claim a rotary drum for the separation of metals, for I know that such have been used for the amalgamation of silver ores and for other purposes; but

What I claim as my invention is—

A rotary drum, consisting of a metal frame, in combination with adjustable perforated plates of glass or similar material, substantially as and for the purposes hereinbefore set forth.

FREDERICK WILLIAM DORN.

Witnesses:
   DAVID W. PRICE,
   JNO. J. COTT.